June 1, 1954
E. C. KIEKHAEFER
2,679,909
PROPELLER AND CLUTCH THEREFOR
Filed March 24, 1949
2 Sheets-Sheet 1
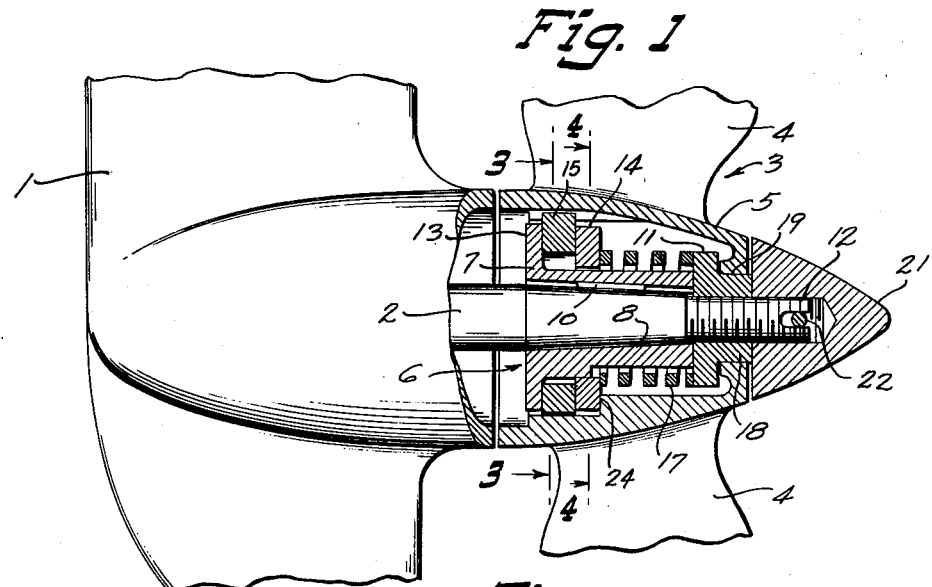
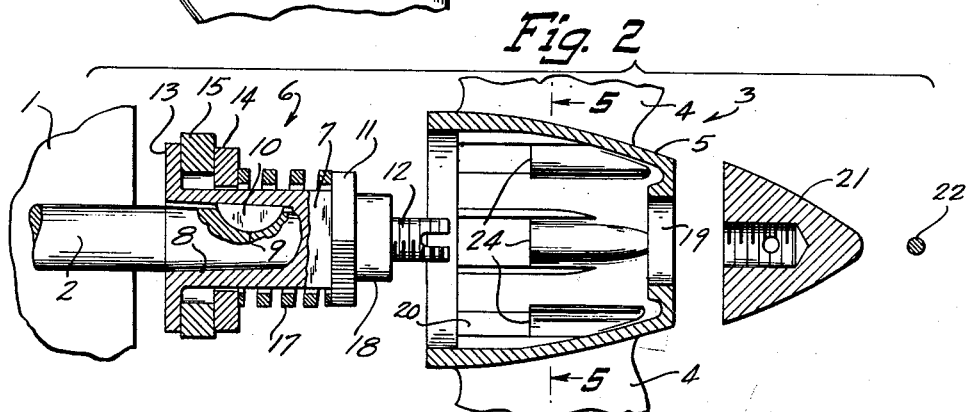
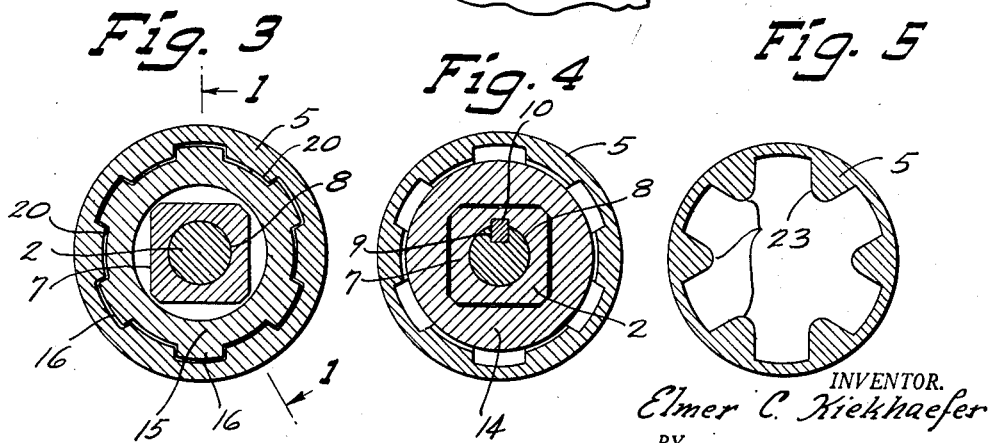
INVENTOR.
Elmer C. Kiekhaefer
BY
Andrus & Sceales
Attorneys

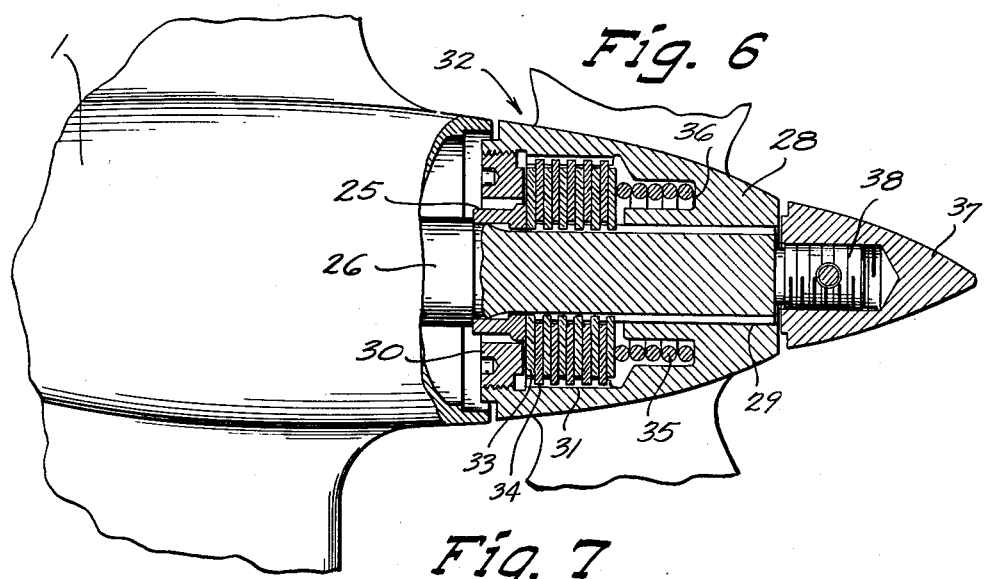
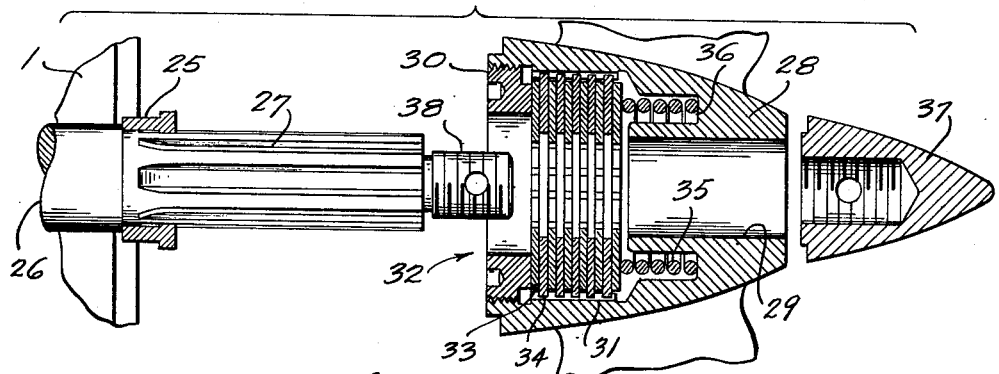
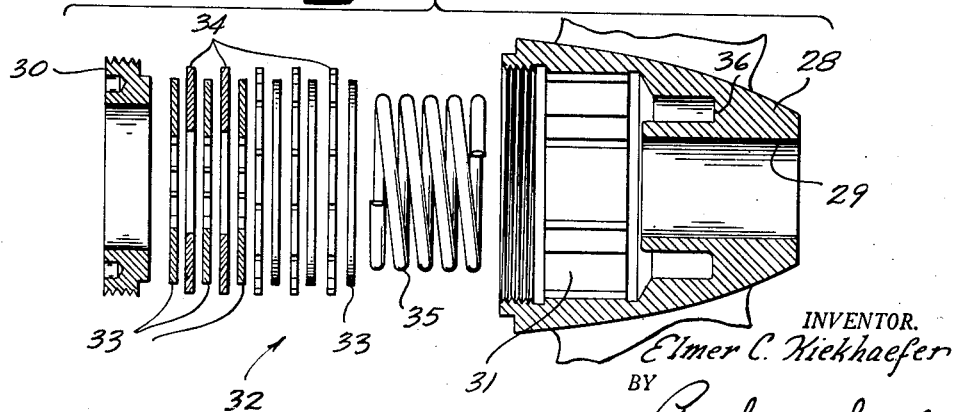

Patented June 1, 1954

2,679,909

UNITED STATES PATENT OFFICE 2,679,909

PROPELLER AND CLUTCH THEREFOR

Elmer C. Kiekhaefer, Cedarburg, Wis.

Application March 24, 1949, Serial No. 83,249

2 Claims. (Cl. 170—135.75)

This invention relates to propellers for motorboats and particularly outboard motors.

An object of the invention is to provide more fully, by means of a slip-clutch, for the protection of the propeller against damage by overloading as when the propeller strikes a submerged object.

A more particular object of the invention is to ensure the correct adjustment of maximum torque of the propeller at all speeds for maximum protection of the propeller without loss of power or propeller thrust due to slippage under normal operating conditions.

Another object is to provide means whereby a slip-clutch may be supplied as a complete unit assembled under established standards of manufacture for installation as a unit with the propeller without change of adjustment.

A more particular object of the invention is to provide for the assembly and disassembly of the propeller from the propeller shaft without disassembly of the slip-clutch unit.

These and other objects and advantages of the invention will be more fully set forth in the following description of a preferred embodiment of the invention as illustrated in the accompanying drawings.

In the drawings:

Figure 1 is a side elevation of the lower end propeller unit of an outboard motor with a portion thereof and of the propeller hub broken away and sectioned;

Fig. 2 is a view similar to Fig. 1 showing the propeller hub and nut removed from the shaft and showing the complete slip-clutch unit retained on the shaft;

Fig. 3 is a transverse section taken on lines 3—3 of Fig. 1;

Fig. 4 is a transverse section taken on lines 4—4 of Fig. 1;

Fig. 5 is a transverse section taken on line 5—5 of Fig. 2;

Fig. 6 is a view similar to Fig. 1 of an alternate embodiment of the invention;

Fig. 7 is a view similar to Fig. 5 showing the propeller hub and nut removed from the shaft and showing the complete slip clutch unit retained within the hub; and Fig. 8 is a view similar to Fig. 6 showing the disassembled propeller hub and clutch unit.

The lower end unit 1 only of an outboard motor is shown in the drawings and includes the propeller shaft 2 which extends rearwardly of unit 1 to carry the propeller 3 having blades 4, not shown in full, which in the operation of the motor may frequently strike submerged objects with consequent damage to the propeller.

The streamlined hollow hub 5 of the propeller is of circular transverse section throughout and houses the slip-clutch unit 6 mounted on shaft 2.

Clutch unit 6 comprises the square bushing 7 having an internal tapered bore 8 and keyway 9 which fits a tapered portion of shaft 2 and the key 10 carried by the shaft. The larger hexagonal nut 11 is mounted on the threaded end 12 of shaft 2 to engage the rear end of bushing 7 and secure the same on shaft 2. The circular flange 13 is formed integrally with bushing 7 at its forward end. The movable clutch plate 14 is mounted on bushing 7 between flange 13 and nut 11 and has a square hole fitting bushing 7 for rotational interlock therewith. The friction element 15 is disposed on bushing 7 for free rotation between flange 13 and plate 14 and is provided with a series of splines 16 about its outer periphery. The spring 17 is disposed on bushing 7 between nut 11 and plate 14 urging the latter axially on bushing 7 to secure element 15 in frictional engagement between flange 13 and plate 14.

The rear bearing 18 supporting the rear end of hub 5 is preferably formed by reducing a portion of nut 11 by machining to circular section to fit the collar 19 formed integrally with hub 5. The splines 20 along the inner surface of hollow hub 5 engage splines 16 of element 15 and fit closely to the outer circular periphery of flange 13 to support the forward end of hub 5.

Propeller 3 is removable from flange 13 and bearing 18 supporting the propeller by withdrawing the same rearwardly over the end 12 of shaft 2. The nut 21, which may be of conical outer dimensions for streamlining, is retained on the threaded end 12 of shaft 2 by the pin 22 and serves to secure hub 5 of the propeller in place on shaft 2, allowing only a limited axial movement of the propeller for purposes as will be described.

In the operation of the motor, not shown, with rotation of shaft 2, the driving torque is transmitted through the frictional engagements of flange 13 and plate 14 with element 15 rotatively secured within hub 5. A maximum torque limit of clutch unit 6 is determined so that the blade 4 striking an underwater object will not be damaged by reason thereof.

The ribs 23 formed within hub 5 are provided with flat forward faces 24 which engage the face of plate 14 within the limited axial movement of hub 5 on bearing 11 and carry the thrust of the propeller in driving the boat forwardly. As the torque load on clutch unit 6 increases, the thrust of propeller 3 increases the torque limit of unit 6 so that no slippage occurs. As will be readily understood, the moment a blade 4 strikes an underwater object to stop the propeller the thrust is eliminated and the torque limit diminishes to that provided by spring 17 and within the predetermined limits established as described above, so that no damage to the propeller occurs.

In the assembly of the propeller, clutch unit 6 is first installed on shaft 2. The propeller 3 is then mounted on unit 6 over the end of shaft 2 and secured thereon by the nut 21 and pin 22. Similarly, propeller 3 may be removed from shaft 2 without removing any part of the clutch so that the latter will not be altered or changed.

In the embodiment of the invention shown in Figs. 6 to 8 the bushing 25 is mounted on the shaft 26 at the forward end of the splined section 27 of the shaft and is interlocked rotationally to the shaft by means of the splines with its forward end abutting a shoulder on the shaft. The propeller hub 28 is provided with an internal bore 29 at the smaller rear end, fitting rotationally over the splined section 27.

The clutch retaining ring 30 is threaded and carried within the larger forward end of hub 28 and has an internal diameter larger than bushing 25 to fit closely thereover. The internal diameter of hub 28 between ring 30 and bore 29 is splined as at 31. The friction clutch unit 32 similar to clutch unit 6 includes a number of friction clutch discs 33 and 34 disposed within hub 28 rearwardly of ring 30 and alternately arranged, as will be described. The spring 35 disposed between the rearmost disc 33 and the inner end wall 36 of hub 28 urges the discs forwardly against ring 30 and in frictional engagement with each other. Discs 33 are internally splined to fit on and engage the splined section 27 of shaft 26 and are free to rotate within hub 28. Discs 34 are free to rotate on shaft 26 and are externally splined to engage splines 31 of hub 28 to rotate therewith.

Clutch unit 32 is assembled within hub 28 by first inserting spring 35 within the hub, arranging discs 33 and 34 in front of spring 35 with discs 34 rotatably engaged within hub 28, and retaining the clutch assembly therein with ring 30 threaded within the forward end of the hub.

Propeller hub 28 and clutch unit 32 are adapted to be assembled on shaft 26 as a unit. The nut 37 is carried by the threaded end 38 of shaft 26 to retain hub 28 thereon.

For normal operation discs 33 and 34 are pressed against ring 30 and the maximum torque limit determined by the pressure of spring 35 as required for the protection of the propeller may be adjusted by turning the threaded ring 30. For acceleration without slippage, hub 28 is disposed to be moved forwardly on shaft 26 by the increased propeller thrust to compress completely spring 35, as shown in Fig. 6, and effect a more secure engagement of discs 33 and 34 and to increase the capacity of clutch unit 32 as required to carry the additional torque load.

The size and capacity of either clutch unit described may be predetermined. The clutch unit then is assembled on the shaft or within the hub of the propeller and removal of the propeller from the shaft may be accomplished without disassembly of the clutch.

Various embodiments of the invention may be employed within the scope of the accompanying claims.

I claim:

1. In an outboard motor and the like, a propeller shaft assembly and a propeller therefor comprising, a shaft having a free end extending rearwardly respecting the normal direction of thrust of the propeller, a circular abutment plate fixed to said shaft and spaced forwardly of said end thereof, a series of friction clutch discs including at least one clutch plate rotationally fixed on said shaft rearwardly of said abutment plate and movable axially with respect thereto and at least one friction clutch element having outer splines and disposed between said plates for rotation relative thereto, a member fixed on said shaft rearwardly of said clutch plate and a spring disposed between said member and clutch plate to bias the latter forwardly and effect the predetermined frictional engagement of said plates and clutch element, a propeller having a hollow hub adapted to be mounted on said shaft for rotation and axial movement with respect thereto and over said plates and spring, said hub having internal splines engaging the splines of said element whereby the propeller is rotationally fixed with respect thereto and is driven by shaft rotation through the frictional engagement of said element and plates as maintained by said spring, and a series of abutments formed within the hub of said propeller and engageable with one of said clutch discs to press the latter forwardly and increase the frictional engagement thereof with said abutment plate in response to propeller thrust in the forward direction.

2. The invention as defined in claim 1 wherein a bearing surface is provided in the rear end of the hub of the propeller for sliding engagement with said member to support the propeller for rotation on the axis of the shaft and allow limited axial movement of the propeller to effect the engagement of said abutments formed within the hub and one of said clutch discs.

References Cited in the file of this patent

UNITED STATES PATENTS

| Number | Name | Date |
| --- | --- | --- |
| 1,323,850 | Fisher | Dec. 2, 1919 |
| 1,427,025 | Schlafly | Aug. 22, 1922 |
| 2,402,197 | Kincannon | June 18, 1946 |
| 2,477,521 | Martin | July 26, 1949 |